United States Patent [19]

Pettersson

[11] Patent Number: 5,520,040
[45] Date of Patent: May 28, 1996

[54] TOOL WITH TWO SHANKS AND TWO HANDLES

[75] Inventor: Lennart Pettersson, Vallingby, Sweden

[73] Assignee: Weidmuller Interface GmbH & Co., Germany

[21] Appl. No.: 275,200

[22] Filed: Jul. 14, 1994

[30] Foreign Application Priority Data

Jul. 19, 1993 [SE] Sweden ............................ 9302452

[51] Int. Cl.$^6$ ............................................. B25B 27/14
[52] U.S. Cl. ..................... 72/409.08; 29/751; 81/352
[58] Field of Search ................ 72/410, 409; 29/751; 81/352, 353

[56] References Cited

U.S. PATENT DOCUMENTS

| 1,274,187 | 7/1918 | Nelson | 81/352 |
| 2,528,816 | 11/1950 | Boyer . | |
| 3,157,075 | 11/1964 | Filia | 29/751 |
| 3,372,478 | 3/1968 | Wallace et al. . | |
| 4,381,661 | 5/1983 | Wiener et al. | 72/409 |
| 4,640,117 | 2/1987 | Anderson | 72/410 |

FOREIGN PATENT DOCUMENTS 1541580 3/1979 United Kingdom .

Primary Examiner—Daniel C. Crane
Attorney, Agent, or Firm—Dowell & Dowell

[57] ABSTRACT

A tool with two shanks and two handles, where the shanks are pivoted in a shank fulcrum which is located rearwardly of the handle fulcrum. In a preferred embodiment, the shank and handle fulcrum are spaced at a distance equal to at least a third of the total length of the tool so that a near-parallel position of the front ends of the shanks is achieved in a final phase of their closing movement.

12 Claims, 3 Drawing Sheets 5,520,040

TOOL WITH TWO SHANKS AND TWO HANDLES

BACKGROUND OF THE INVENTION

The invention refers to a tool having two shanks pivoted one to another and two handles pivoted one to another and driving to shanks. The handles pivot around a handle fulcrum and the shanks pivot around a shank fulcrum which is separate from the handle fulcrum and lies in front of the handle fulcrum. The "shanks" in the present description and in the annexed claims are understood to be members ("die carriers") which carry operating means, e.g. press dies, and terms such as "ahead", "in front of", "forwardly" etc., on the one hand, and "rearwardly" and the like, on the other hand, refer to the direction from the front ends of the shanks, where the operative means can be mounted, to the free rear ends of the handles.

HISTORY OF THE RELATED ART

Scissor-type tools of this kind are known, such as lopping shears described in the U.S. Pat. No. 3,372,478 in which the handles bent at their front ends, and are in a handle fulcrum pivoted one with another. The two shanks carry at their front ends a cutting edge and an anvil, respectively, and are at their opposite ends pivoted one with another in a shank fulcrum which is located rearwardly of the handle fulcrum. The bent parts of the handles are provided with short extensions extending beyond the handle fulcrum, and are by means of these extensions pivoted to the shanks. The purpose of the arrangement is to keep the cutting edge and the anvil in the same plane during the operative motion of the shanks.

In the U.S. Pat. No. 2,528,816 are described hedge shears which are provided with two longitudinal cutting blades, one mounted on a shank which is with one of the handles consolidated to a rigid tool body. The other cutting blade is mounted on a shank which in a shank fulcrum is pivoted to the tool body by means of a pivot passing through a longitudinal hole. The other handle is pivoted to the tool body in a handle fulcrum which is located ahead of the shank fulcrum. The purpose of the arrangement is to achieve limited longitudinal mobility of the pivoted shank.

In both above mentioned tools, the spacing of the two fulcrums is very small relative to the total length (appr. 4% in the first, and appr. 13% in the second instance), and whether or not of the operative means are parallel when performing their task is of no issue.

It is further known to achieve in pliers the possibility to set or re-adjust operative means such as crimping dies and/or to compensate productional variations by providing a pivot which embodies a fulcrum with an eccentrical central (lengthwise) part, or by dividing the shank by a longitudinal slot, open at one its end, into a firmly anchored part and a sprung part, and mounting the operative means on the end of the sprung part. The last mentioned solution is shown e.g. in FIG. 1 in the U.S. Pat. No. 4,381,661.

The present invention refers primarily to pliers-type tools, and more specifically to pliers in which parallel disposition of the operative means which are carried on the shanks is required, at least in the final phase of their closing (approaching) movement.

Generally, the shanks do, even in pliers, execute a scissors-like, i.e. non-parallel, opening and closing movement. In some instances, e.g. when crimping cable shoes onto electrical conductors by introducing the cable shoes frontally in the crimping pliers, such parallel disposition of the crimping dies is mandatory. By "frontally introducing" is understood that the work piece is introduced into the operative means from the front end of the tool in the longitudinal direction of tool (arrow P in FIG. 4).

Unparallel disposition of the crimping dies would cause irregular crimping of the cable shoe, deeper on the outer end than on the inner one, and lead to an unacceptable wedge-shaped longitudinal cross-section of the crimped cable shoe.

This drawback is not present in so called parallel pliers. There are known several designs of parallel pliers in which parallel disposition of the operating means during the entire closing motion of the shanks is obtained e.g. with the aid of a parallel mechanism, or by mounting one shank or one jaw for a gliding motion as in a vice, as e.g. shown in FIG. 5 in the U.S. Pat. No. 4,381,661 of the Applicants, or by mounting the jaws on the shanks pivotally, as e.g. shown in FIG. 7 of the U.S. Pat. No. 4,381,661.

Common to all known parallel pliers is that they comprise more parts than pliers with scissors-like movement.

The present invention is based on the following reflections. Firstly, parallel alignment of the operative means is meaningful only in the final stage of the closing (approaching) movement, when the operative means, such as jaws or dies, actually engage the work piece. Secondly, in many instances in practice, e.g. in the above mentioned crimping operation, it is not absolutely exact parallel alignment which is required, but an approximate parallel alignment is evidently fully sufficient.

Thirdly, it is obvious that when the free ends of two pair of scissors, one with short shanks, and the other with long shanks, are spaced one from another by the same length, e.g. 3 mm, the long shanks will out of geometrical reasons be less inclined one to another than the short ones. And "less inclined" is the same as "more parallel".

Thus, if the shanks in conventional pliers, operating according to the scissors principle, would be sufficiently elongated, a near-parallel disposition of the front ends of the shanks, where the operative means are carried, would be obtained in the final phase of the closing movement of the long shanks. This solution, functionally satisfactory in many instances, would, however, have the disadvantage of a such a tool being considerably longer, i.e. considerably less handy, than known pliers, parallel or not. This drawback is the more serious with crimping pliers, as these are often carried in a tool box or tool bag for use with external installations etc.

SUMMARY OF THE INVENTION

It is therefore an object of the present invention to provide a pair of pliers with a near-parallel disposition of the free ends of the shanks in the final phase of the closing movement, a disposition which is sufficient in many practical applications, without extending, or significantly extending, the total length of the tool (relative to conventional pliers with scissors-like motion of the shanks).

It is another object of the invention not to essentially increase the number of parts in such a pair of pliers (relative to conventional pliers with scissor-like motion of the shanks), and in any case to hold this number lower than in known parallel pliers.

The solution according to the present invention is founded on the reflection that when in the introductorily mentioned scissors-type tools the shank fulcrum lies behind the handle fulcrum, even if only a relatively short distance behind it, a part of the length of the shanks overlaps with a part of the length of the handles. By making maximal use of this circumstance, a pair of pliers may be constructed in which a considerable part of the length of the shanks, up to the entire length of the shanks, may overlap the length of the handles.

Consequently, a tool in accordance with the present invention, includes two shanks having front ends for carrying operating means, and rear ends at which they, in a shank fulcrum, are pivoted together for executing an opening and a closing movement, and two handles for operating the shanks in the movements and which, in a handle fulcrum, separate from said shank fulcrum, are pivoted one with another. The shank fulcrum being located a substantial distance rearwardly of the handle fulcrum so as to achieve a near-parallel position of the front ends of the shanks in the end phase of closing movement. The spacing of the two fulcrums may be e.g. at least one third of the total length of the tool.

In a preferred embodiment, the shanks are provided with rearwardly extending rod-shaped extensions defining the first handle, and the pivot embodying the shank fulcrum is located at the rear end of the extensions.

The invention shall now be explained in greater detail with the aid of exemplary embodiments according to the enclosed drawing.

DETAILED DESCRIPTION OF THE INVENTION

Figure 1:
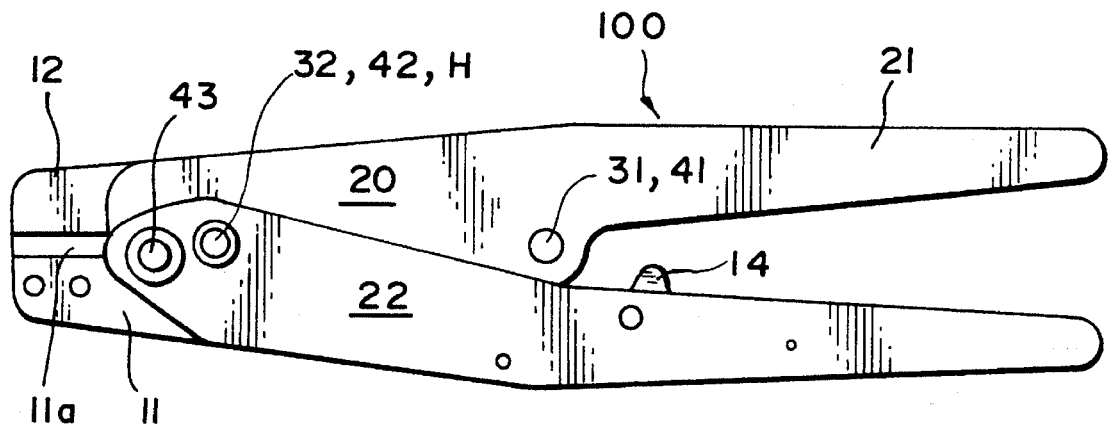
FIG. 1 is a side view of a first embodiment of the pliers according to the invention.

According to FIGS. 1 through 4 crimping pliers 100 comprise a first shank 11 and a first handle 21, which are consolidated as a rigid tool body 20. A second shank 12 is pivoted to the tool body 20 by a pivot 41, and a second handle 22 by a pivot 42.

Figure 3:
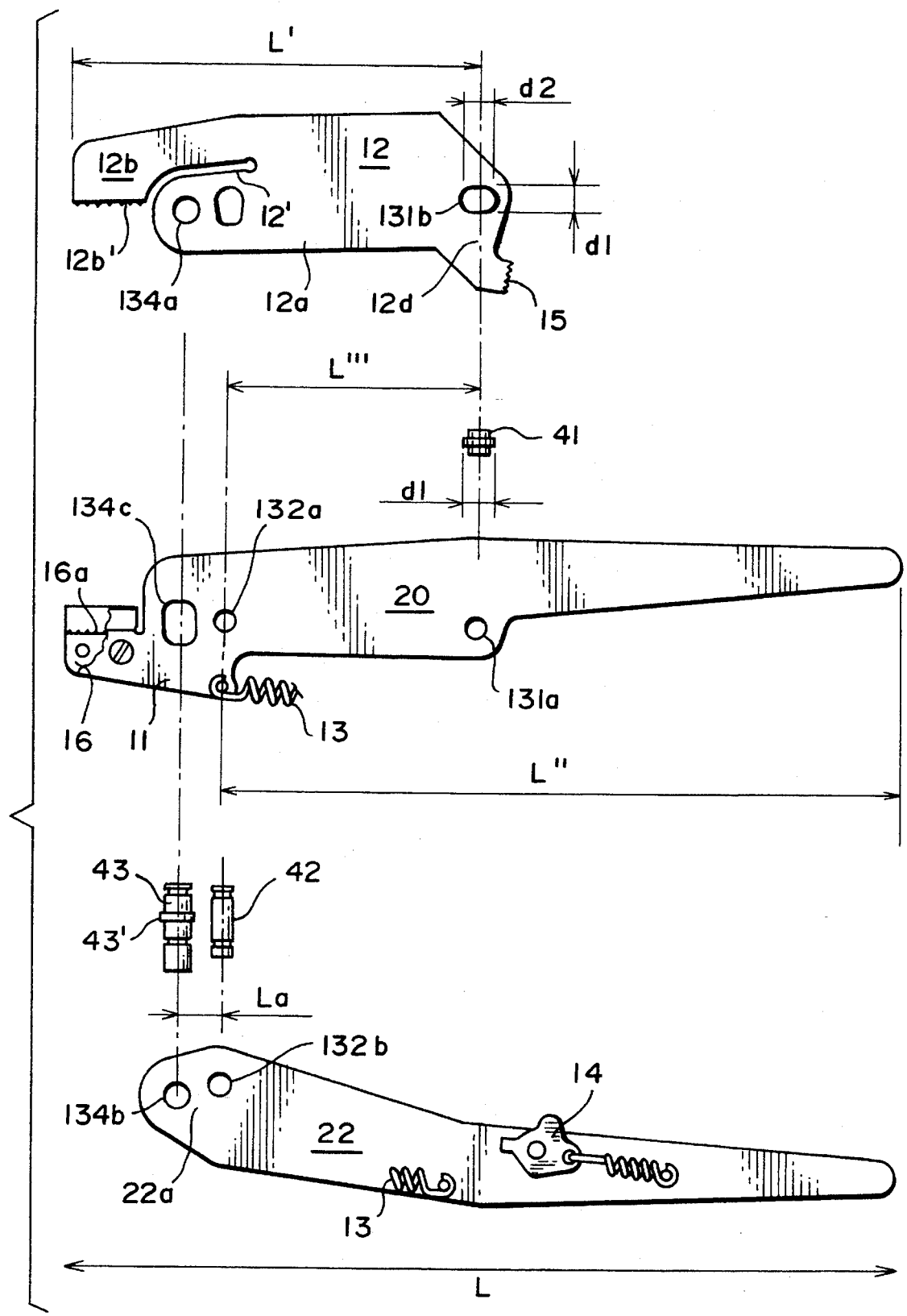
FIG. 3 shows in a lateral view the individual parts of the pliers of FIGS. 1 and 2.

The pivot 41 embodies the shank fulcrum S (FIG. 4), and pivot 42 embodies the handle fulcrum H. The pivot 41 is mounted in an opening 131a (FIG. 3), and the pivot 42 in an opening 132a in the tool body 20, the shank fulcrum S or pivot 41 being spaced from the handle fulcrum H or pivot 42 rearwardly by a distance L''' (FIG. 3). The distance L''' is the distance with which the length L' of the shanks 11, 12 overlaps the length of the handles 21, 22, and it is preferably equal to at least a third of the total length L of the tool (L= L' + L" – L''').

The second shank 12 is provided with an opening 131b through which the pivot 41 may pass. The tool body 20 consists, in known manner, of two parallel and spaced apart side plates 20', 20" (FIG. 2), between which the second shank 12, consisting of one single plate, is mounted. Even the second shank 22 may consist of two side plates 22', 22" which are mounted alongside the outer faces of the tool body side plates 20', 20". Both handles 21, 22 are in per se known manner provided with covers 21a, 21b which, however, for clarity are shown only in FIG. 4.

The second handle 22 is provided with an opening 132b for the pivot 42, and has an extension 22a (FIG. 3) which extends forwardly beyond the opening 132b. On the extension 22a, at a distance $L_a$ forwardly of the opening 132b, is an opening 134b provided for a pivot 43 serving for the attachment of the second shank 12. The pivot 43 is anchored in the second shank 12 in the opening 134b and passes through another opening 134c in the tool body 20. The opening 134c is longitudinal in the direction at right angles to the length direction of the tool body 20, or it has such dimensions that the pivot 43 may in all swinging positions of the second shank 12 and of the second handle 22 pass through it undisturbed.

Figure 2:
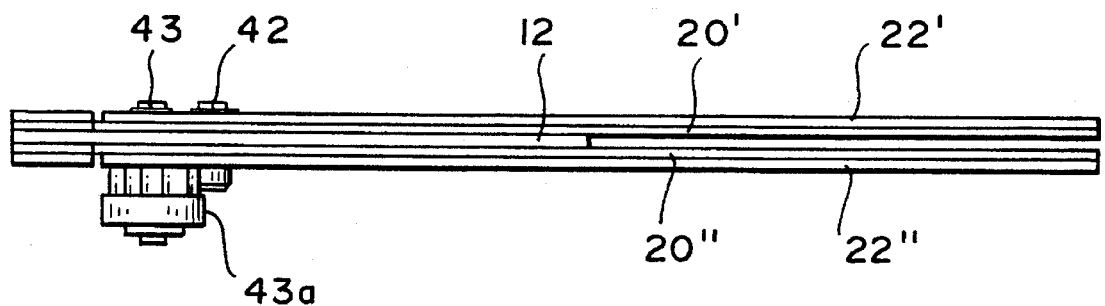
FIG. 2 is a top plan view of the pliers of FIG. 1.

The pivot 43 may in known manner be provided with an eccentrical central part 43' which, in the assembled tool 100, is located in the opening 134a, so that by selecting a rotational position of the pivot 43, and fixing it by means of a known (only in FIG. 2 shown) fixing means 43, the position of the second shank 12 relative to the tool body 20 may be re-adjusted.

Alternatively, the second shank 12 may in known manner be provided with a longitudinal slot 12' which is open at one its end and which divides the shank 12 in a first part 12a and a second part 12b. In the first part 12a is the opening 134a located, and at the end of the second part 12b is the respective operative means, e.g. a crimping die 12b', mounted.

The two parts 12a, 12b are so dimensioned, and/or the slot 12' is so arranged, that part 12b is sprung relative to part 12a, whereby a re-adjusting possibility, automatical in the instance, is obtained, in analogy to the (non-automatical) change of the rotational position of a pivot with an eccentrical central part. As a rule, only the one or the other of the mentioned readjustment measures needs to be used at a time.

The opening 131b in the second shank 12 is longitudinal ($d_2$) in the length direction of the shank in order to ensure undisturbed co-operation between this shank 12, the tool body 20 and the handle 22 in all their mutual swinging positions. The opening 131b has, transversely to the length direction of the shank, the same dimension ($d_1$) as the pivot 41. The values for $d_1$ and $d_2$ may be e.g. 6 and 7 mm respectively.

Alternatively, to the same purpose, one of the openings: 134a in the second shank 12, or 134b in the second handle 22 (through which two openings the pivot 43 passes), or 131a in the tool body 20 (through which the pivot 41 passes), may be made longitudinal in the above said manner. The opening 134c in the tool body 20 has in any case to be larger than the diameter of the pivot 43 even in the length direction of the tool body 20.

To sum up, the pivot at the point where the second handle 22 is connected to the tool body 20, or the pivot in the shank fulcrum S, shall have the possibility of some limited free motion in the length direction of the shank.

The operative means, such as crimping dies or the like, may be embodied either by a suitably adapted end part of the respective shank, as shown at 12a on the second shank 12, or by a separate, preferably exchangeably mounted member, such as an insert plate 16 with an operative face 16a, as shown on the first shank 11.

Figure 4:
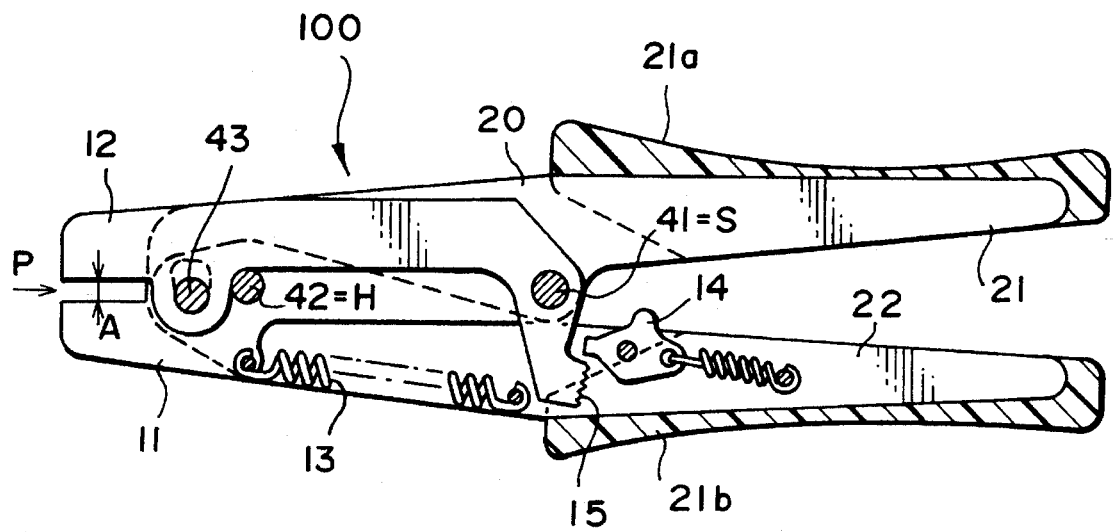
FIG. 4 is a longitudinal section through the pliers.

The pliers 100 are crimping pliers with frontal introduction, i.e. pliers into which the work piece is introduced in their longitudinal direction (arrow P in FIG. 4). An unparallel position of the crimping dies 12b', 16a in the terminal phase of the operative motion of the second shank 12 would induce, as already mentioned, irregular crimping, stronger on the outer end than at the inner one, of the respective cable shoe.

The insert plate 16 is with the aid of screws fixedly mounted between the front parts of the two side plates 20', 20", and these front parts may preferably on their edge sections such as 11a, which are turned toward the second shank 12, be outwardly bent into a V-shape, so as to lead the work piece toward and-on the operative face 16a of the insert plate 16.

The co-operating crimping faces 12a and 16a may be preferably arranged so that they do not occupy an exactly parallel mutual position either in the fully opened, or in the fully closed position of the shanks 11, 12, but in an intermediate position of the shanks, e.g. as shown in FIG. 4, where their spacing A has a selected value equal to the average value of the diameter of the expected work pieces, e.g. 3 mm.

However, even without this measure, a satifactory result will be obtained with the pliers according to the invention, as should be evident from the following comparison. In conventional pliers with the shape of the pliers of FIG. 1, and the shank fulcrum located at 32, the two shanks would at an opening of approximately 3 mm subtend an angle of approximately 20°. In the pliers of the invention they subtend at said opening an angle of approximately 3°. An unparallelity of 3° lies within the permissible production variations with the (rather more complicated) "strictly parallel" pliers, the pliers of the invention not comprising more main component parts than the three shown in FIG. 3.

The pliers 100 are in per se known manner provided with a tension spring 13 (FIG. 4) anchored in the tool body 20 and in the second handle 22, and which serves to bring the second handle 22 back into its initial position when a work operation has been finished.

The pliers 100 are further provided with a locking mechanism for preventing premature opening in the end phase of a working operation. Said mechanism comprises a spring-loaded ratchet 14 which is rotatably mounted in the second handle 22 and which meshes with a row of teeth 15 arranged on the second shank 12, substantially at right angles to longitudinal direction of this shank.

Figure 6:
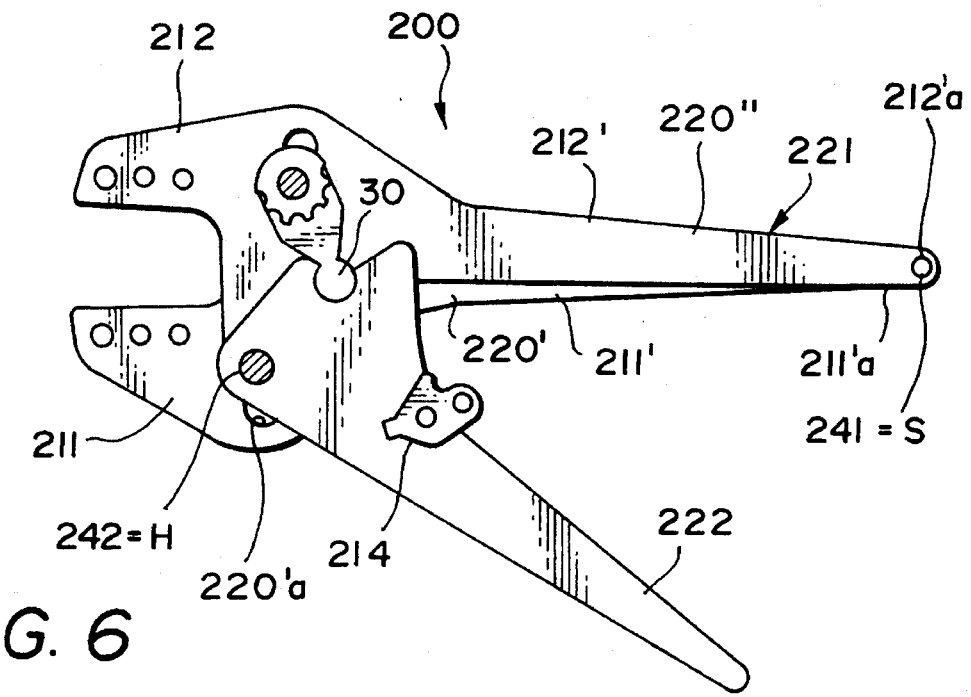
FIG. 6 is a longitudinal section through the pliers of FIG. 5 in open state showing one set of a pair of shank and first handle portions connected to a second handle portion.
Figure 5:
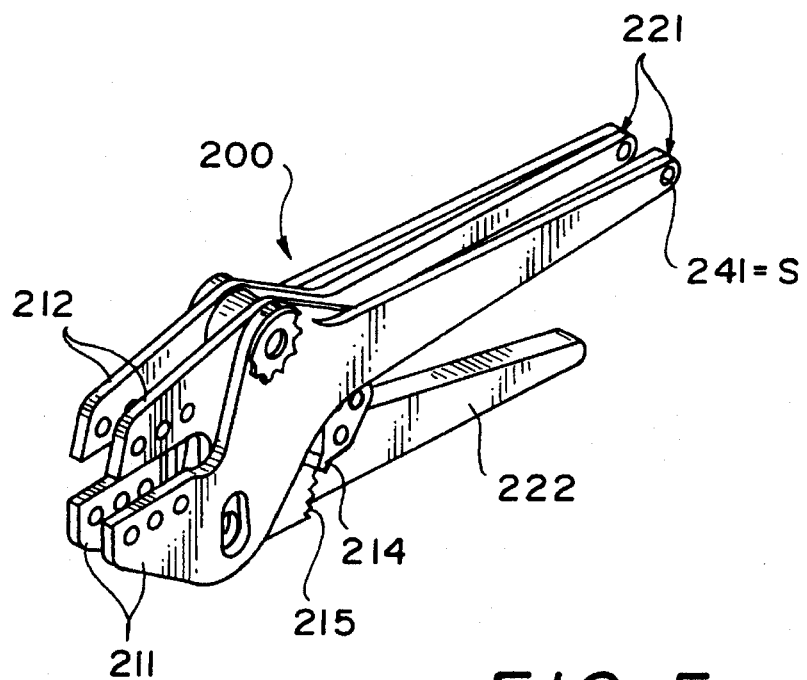
FIG. 5 is a perspective view of a second embodiment in closed state.

In FIGS. 5 and 6 is shown another embodiment 200 of the pliers according to the present invention. Component parts corresponding to those of the pliers 100 are provided with reference numerals increased by 200.

Both shanks 211, 212, on the forward ends of which an operative means can be mounted, are provided with rigidly attached (integrally formed), rearwardly extending, rod-shaped extensions 211', 212' which have the length of a conventional handle The two shanks 211, 212 are thus converted into a pair of co-operating tool body units 220', 220", whose extensions together the first handle 221 of the tool.

The second handle 222 is by a pivot 242 pivotally attached to the first tool body unit 220', i.e. the unit 211/211'. The pivot 242 passes through a longitudinal opening 220'a in the second tool body unit 220" and defines the handle fulcrum H of the tool.

Both handle-extensions 211', 212' are at their rear free ends 211'a, 212'a pivotally connected one with another by a pivot 241, which defines the shank fulcrum S of the tool 200.

Transmission of motion and force from the second handle 222 to the second tool body unit 220" occurs by means of a "flat ball-and-socket joint" mechanism 30, known as such. By operating the second handle 222, the second tool body unit 220" is swung around the shank fulcrum S of the tool, embodied by the pivot 241a.

In the embodiment shown, not one, but two, parallel and spaced, pairs of tool body units 220', 220" are used, so that between both shank portions 211, 212 of the two pairs a free space is obtained for mounting the operative means, analogically as between the two side plates 20', 20" of the tool 100 of FIG. 2.

Using the terminology of FIG. 3, in the pliers 200 the overlapping length L''' is equal to the entire handle length L''.

What is claimed is:

1. A pliers-like tool comprising:
   first and second shanks each having a front portion including a portion adapted to carry an operating means and a rear portion;
   said rear portion of at least said first shank forming a first handle;
   a shank fulcrum means pivotally connecting said first and second shank to one another so as to allow a swinging opening and closing motion therebetween;
   a second handle operative with said first handle for moving said first and second shanks in said closing motion;
   a handle fulcrum means pivotally joining said first shank to said second handle;
   said shank fulcrum means being located at a distance spaced rearwardly of said handle fulcrum means so that at least a portion of the length of said first and second shanks overlaps with at least a portion of a length of said first and second handles so that a substantially parallel orientation of said portions adapted to carry an operating means of said first and second shanks is obtained in a final phase of said closing motion.

2. The pliers-like tool of claim 1 in which said shank fulcrum means includes a first pivot pin retained within shank fulcrum openings in said first and second shanks and said handle fulcrum means includes a second pivot pin retained within handle fulcrum openings in said first and second shanks.

3. The pliers-like tool of claim 1 wherein each of said first and second shanks includes a pair of shank plates, said rear portion of each said first and second shanks forming a first handle, said first handle having a rear end, and said shank fulcrum means including first and second pivots extending through said pair of shank plates of said first and second shanks, respectively, adjacent said rear end of said first handle.

4. The pliers-like tool of claim 2 wherein said second handle includes an extension extending forwardly of said handle fulcrum means, aligned openings in said front portions of each of said first and second shank means which are aligned with an opening in said extension, and a pivot element mounted within said aligned openings and said opening in said extension.

5. The pliers-like tool of claim 4 wherein said shank fulcrum opening in said second shank is oblong to permit a longitudinal shifting of said pivot pin of said shank fulcrum means therein.

6. The pliers-like tool of claim 1 wherein said second shank includes a longitudinal slot in said front portion thereof, dividing said front portion into upper and lower sections, said upper section including said portion adapted to carry an operating means.

7. The pliers-like tool of claim 1 wherein said portions adapted to carry an operating means of each of said first and second shanks have operative means mounted thereto so as to be in opposition with one another, said operative means being separable to a maximum distance and closeable to a minimum distance and extending parallel to one another at a pre-selected distance less than said maximum distance.

8. The pliers-like tool of claim 1 including a flat ball and socket joint pivotally connecting said second handle to said second shank.

9. The pliers-like tool of claim 1 wherein the tool has a length, said shank fulcrum means and said handle fulcrum means being spaced a distance at least equal to one third of said length.

10. The pliers-like tool of claim 3 including a pair of first and second shanks having substantially parallel shank plates, and said second handle being mounted between said pair of first and second shanks.

11. A pliers-like tool comprising:

first and second tool body units, each of said tool body units including a shank portion having a forward end for carrying an operative means and a rigidly connected first handle extending to a rear of said shank portion, each of said first handles having a rear end;

a pivot means for pivotally connecting said rear ends of said handles of said first and second tool body units to define a shank fulcrum about which said shank portions of said first and second tool body units pivot;

a second handle pivotally connected to said first and second tool body units by a pivot means defining a handle fulcrum, said handle fulcrum being located forwardly of said shank fulcrum, said handle fulcrum being generally located adjacent a transition zone between said shank portions and said first handles of said first and second tool body units; and means for transmitting motion and force from said second handle to said first and second tool body units to pivot said first and second tool body units about said shank fulcrum.

12. The pliers-like tool of claim 11 wherein said means for transmitting motion and force includes a flat ball and socket joint mechanism.

* * * * *